United States Patent [19]
Hatch et al.

[11] Patent Number: 5,299,081
[45] Date of Patent: Mar. 29, 1994

[54] MAGNETIC HEAD SUSPENSION ASSEMBLY

[75] Inventors: Michael R. Hatch, Mountain View; Chak M. Leung, Palo Alto; Stephen S. Murray, Fremont, all of Calif.

[73] Assignee: Read-Rite Corporation, Milpitas, Calif.

[21] Appl. No.: 926,033

[22] Filed: Aug. 5, 1992

[51] Int. Cl.⁵ .............................. G11B 5/48
[52] U.S. Cl. ................... 360/104; 360/103
[58] Field of Search ................ 360/103–105

[56] References Cited

U.S. PATENT DOCUMENTS

| | | | |
|---|---|---|---|
| 4,819,094 | 4/1989 | Oberg | 360/104 |
| 5,027,240 | 6/1991 | Zarouri et al. | 360/104 |
| 5,115,363 | 5/1992 | Khan et al. | 360/104 |
| 5,138,507 | 8/1992 | Zarouri et al. | 360/104 |

FOREIGN PATENT DOCUMENTS

| | | | |
|---|---|---|---|
| 61-192081 | 8/1986 | Japan | 360/104 |
| 63-144475 | 6/1988 | Japan | 360/104 |
| 92/05542 | 4/1992 | World Int. Prop. O. | 360/104 |
| 92/09076 | 5/1992 | World Int. Prop. O. | 360/104 |

*Primary Examiner*—John H. Wolff
*Attorney, Agent, or Firm*—Nathan N. Kallman

[57] ABSTRACT

A magnetic head suspension assembly is fabricated with a load beam formed with a central triangular-type major section, a tongue section at the front end and a rigid mount section at the opposing rear end. The load beam has flanges along the sides of the central major section and the rear mount section. A leaf spring is provided between the central major section and the rear mount section for providing flexibility to the suspension. A flexure that is joined to the load beam is formed with a U-shaped finger surrounded by a cutout at the front end of the flexure. A load dimple that is provided on the flexure is in contact with the load beam. The flexure supports an air bearing slider that pitches and rolls relative to a disk surface. The flexure does not extend beyond the load dimple of the flexure or the front leading edge of the slider. The suspension is characterized by a high first bending mode frequency and low pitch and roll stiffness.

6 Claims, 6 Drawing Sheets

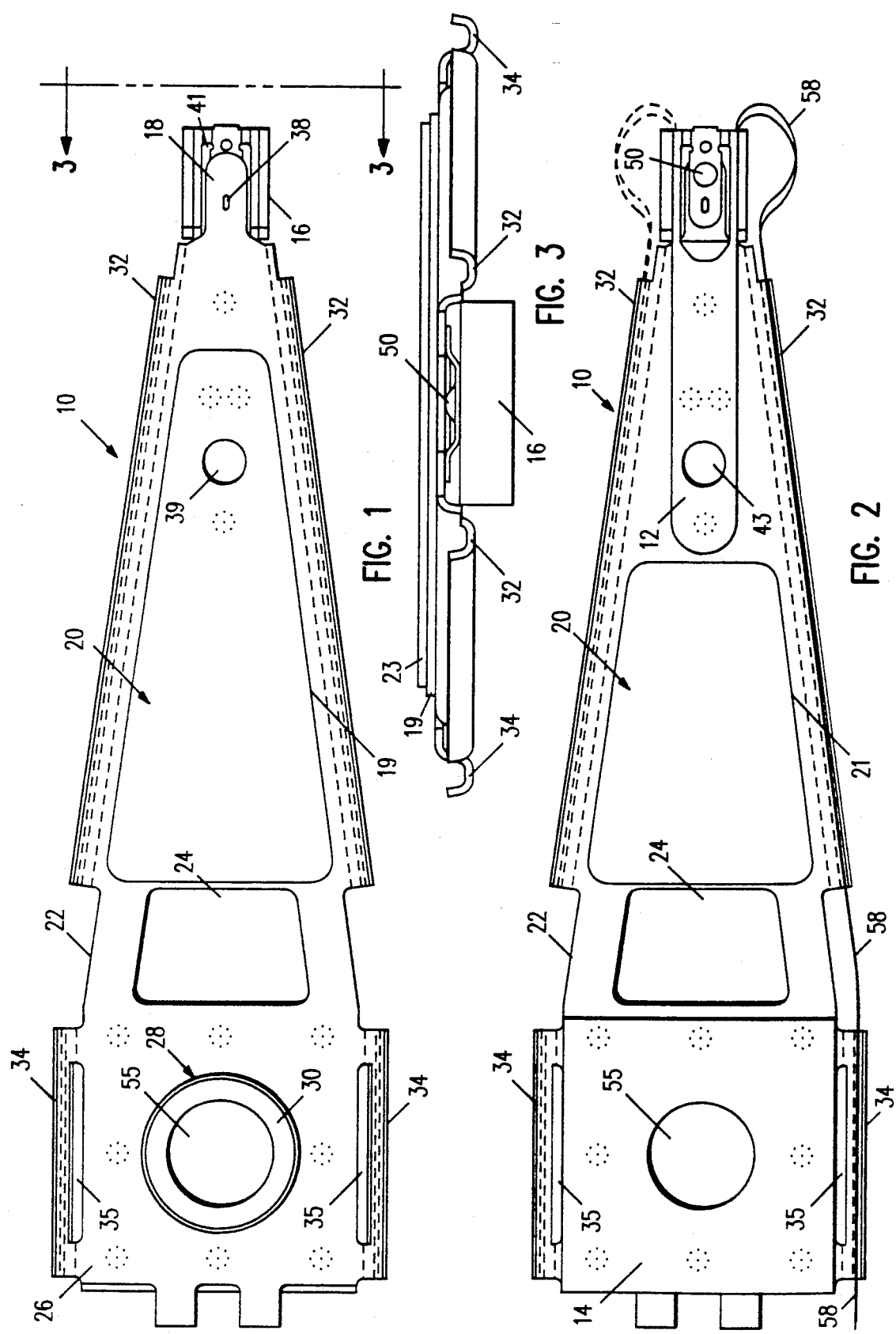

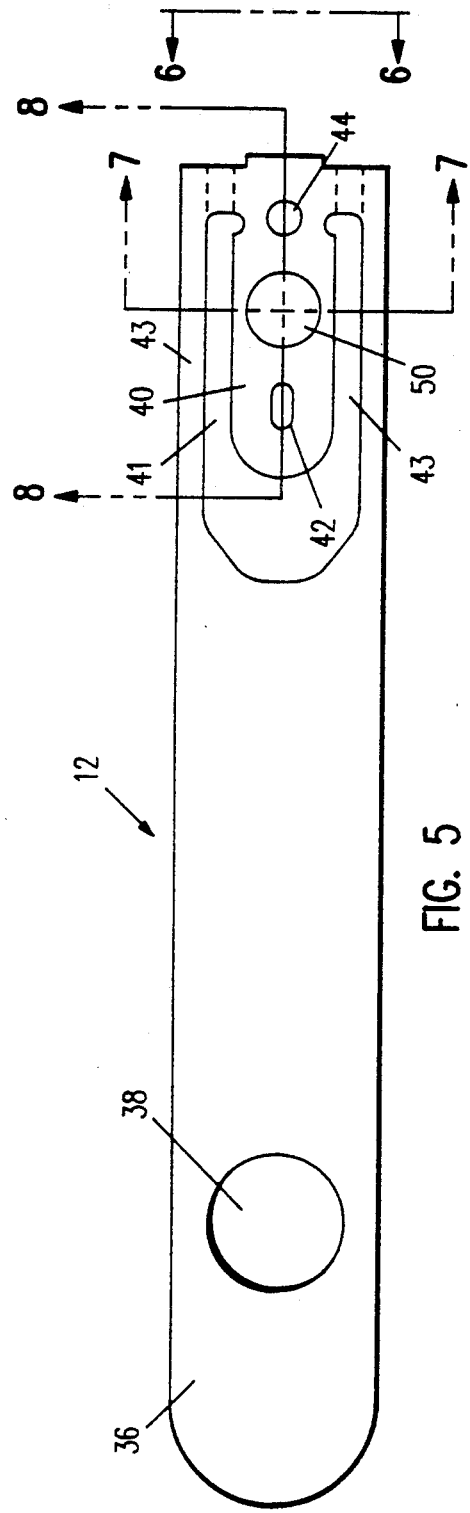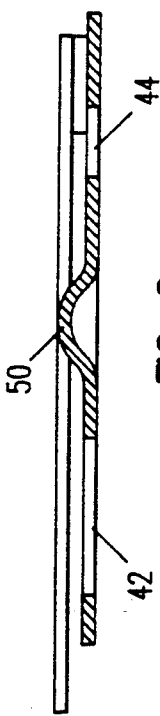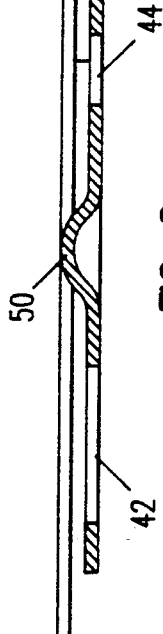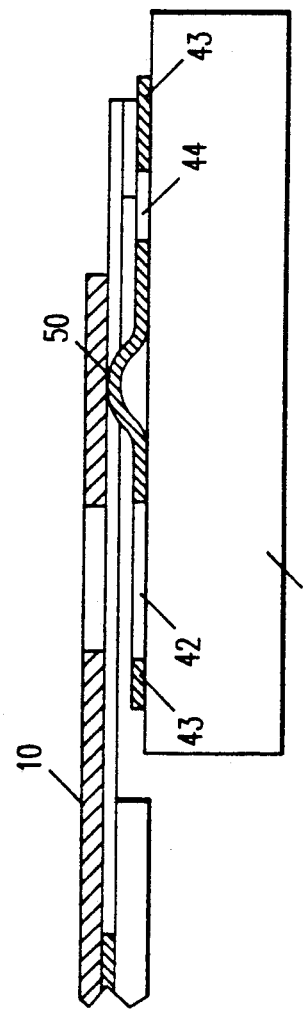

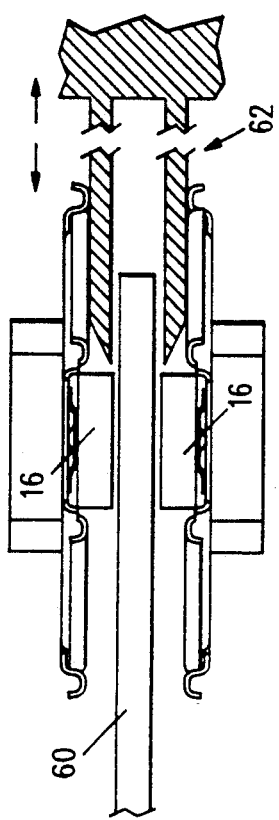
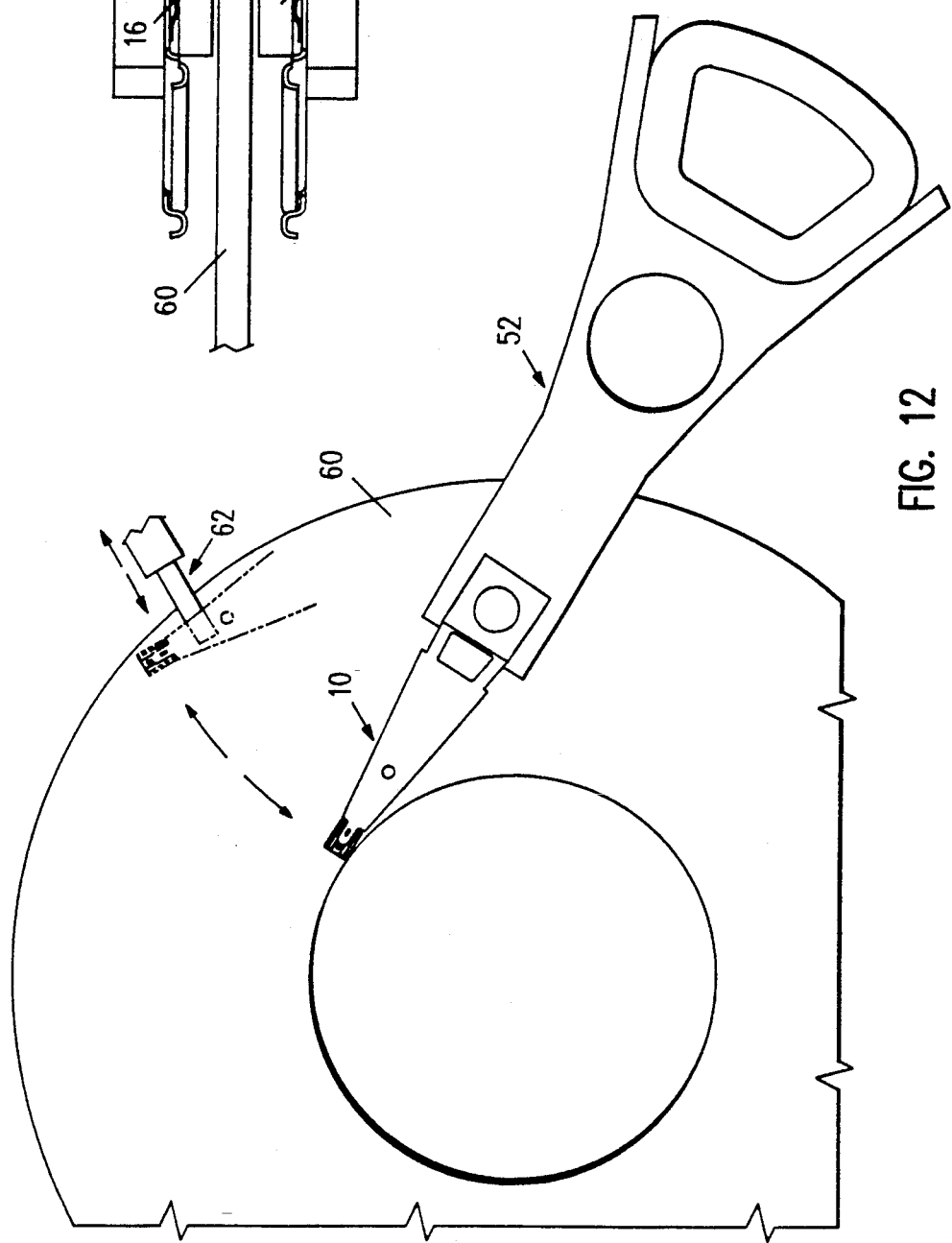
FIG. 13
FIG. 12

MAGNETIC HEAD SUSPENSION ASSEMBLY

FIELD OF THE INVENTION

This invention relates to a magnetic head suspension assembly particularly useful with nanosliders in compact disk drives.

DESCRIPTION OF THE PRIOR ART

Presently known disk drives, such as used in laptop or notebook computers, include at least one rotatable magnetic disk, at least one magnetic head assembly for transducing data recorded on the disk, and a rotary head actuator for transporting the magnetic head to selected data tracks on the rotating disk. The magnetic head assembly comprises a head suspension fabricated with a rigid load beam element and a spring-loaded flexure. An air bearing slider is mounted at the end of the flexure and supports a thin film magnetic transducer which coacts with the magnetic disk for recording or reading data.

During operation of the disk drive, the rotating magnetic disk provides an aerodynamic lift force to the slider, while an opposing gram load force is applied to the slider through the flexure. The resultant of the two opposing forces determines the flying height of the slider and its transducer relative to the disk surface. In its operating flying mode, the slider gimbals about a load dimple formed in the flexure.

The load beam element of the head suspension assembly typically is formed with flanges along the sides of the load beam. In addition to providing low pitch and roll stiffness and low bending stiffness of the head suspension, it is desirable to achieve a high first bending mode resonant frequency of the suspension so that the slider can follow the variations in topography of the rotating disk surface.

In the conventional head suspension, the side flanges of the load beam generally extend up to or past the load dimple in the direction towards the slider. In conventional disk drive designs, the flanges are turned upwardly away from the disk surface to avoid hitting the flexure which is attached to the load beam. The upward bend apparently adds to the Z-height (vertical height) of the head suspension. In a compact disk drive which incorporates a plurality of head suspensions for coaction with a plurality of disk surfaces, the total of the individual Z-heights is increased significantly with the normally upward bent flanges and thus the total height of the disk drive is unduly increased. When designing compact disk drives, it is desirable to minimize the height as well as the overall area of the drive. To this end, the size and mass of head sliders have been reduced progressively. One type of slider that is presently used is the nanoslider, that measures approximately 0.080 inch long, 0.063 inch wide and 0.017 inch high, which is about 50% in length of a standard slider. The novel design disclosed herein is particulary applicable to nanosliders, but may be used with other size sliders.

When assembling the flexure to the slider, it is necessary to position the load dimple of the flexure at a predetermined point relative to the top surface of the slider in order to achieve proper gimballing action of the suspension. However the load dimple is not visible to the assembler when following the conventional assembly method, because the load dimple is located at the bottom surface of the flexure which faces the top non-air bearing surface of the slider. Accurate alignment of the slider with the flexure and load dimple is difficult when following the prior art approach.

In prior art head suspension assemblies, the wire leads extending from the transducer coil to the head circuitry are enclosed in protective tubing. The wire tubing is placed within channels of the side flanges of the load beam. In such case, the channels must be made sufficiently large to accommodate the tubing, with a resultant increase in Z-height of the suspension design.

SUMMARY OF THE INVENTION

An object of this invention is to provide a head suspension assembly having significantly reduced Z-height, thereby affording closer spacing of the heads and disks in a compact disk drive.

Another object of this invention is to provide a head suspension assembly characterized by low pitch and roll stiffness.

Another object is to provide a head suspension assembly characterized by low bending stiffness with decreased gram load tolerance effects.

Another object is to provide a head suspension assembly characterized by a relatively high first bending mode, first torsion mode, and first lateral mode resonant frequencies.

A further object of this invention is to provide a head suspension assembly having a configuration that allows more data tracks to be recorded on a disk surface in a disk drive using a rotary head actuator.

A still further object is to provide a head suspension design that simplifies the assembly of a slider to a flexure.

According to this invention a head suspension assembly is formed with a load beam configured with a central triangular-type major section, a tongue portion at a front end, a rectangular mount section at the rear end for mounting the suspension to an actuator arm, and a leaf spring or flexible section between the central major section and the rear mount section. A swage plate is joined to the mount section of the load beam to provide rigidity. Flanges are formed along the sides of the load beam to provide a desired stiffness to the suspension. The length of the flanges end at a point along the major section of the load beam that allows space for the narrow flexure to be positioned within the narrow portion of the triangular-type major section of the load beam without interference from the flanges. The flanges are formed with U-shaped channels that bend in a direction towards the disk surface, reverse to the conventional bend, so that adjacent head suspensions can be positioned closer together. Insulated electrical wiring associated with the head circuitry is located within the channels of the flanges and does not require insulation tubing, thus allowing smaller shallow flange channels with a significant savings in space. The shallow U-sections of the flange channels allow maximum clearance for head loading.

A flexure is formed with a finger bounded by a U-shaped cutout. The flexure has a load dimple formed on the finger about which an air bearing slider can pitch and roll in a gimbal action relative to the surface of a rotating disk. The load dimple makes contact with the lower surface of the load beam tongue.

The flexure finger and load beam tongue are formed with apertures which enable visual or optical alignment during assembly of the slider to the load beam tongue. In the suspension design disclosed herein, the flexure structure does not extend beyond the leading edge of the slider to enable easy access at the end of the slider for wire bonding and assembly. Also the narrow flexure and slider allows more data tracks to be recorded on a disk surface than with conventional designs in which data recording space at the outer diameter is lost.

BRIEF DESCRIPTION OF THE DRAWINGS

The invention will be described in greater detail with reference to the drawing in which:

FIG. 1 is a top plan view of a head suspension assembly, made in accordance with this invention;

FIG. 2 is a bottom plan view of the head suspension of FIG. 1;

FIG. 3 is an enlarged front end view taken along lines 3—3 of the head suspension of FIG. 1;

FIG. 5 is a top plan view of the flexure used with the head suspension of FIG. 1;

FIG. 6 is an enlarged front end view taken along lines 6—6 of the flexure of FIG. 5;

FIG. 7 is an enlarged sectional view taken along lines 7—7 of FIG. 5;

FIG. 8 is an enlarged sectional view taken across lines 8—8 of FIG. 5;

FIG. 8A is an enlarged sectional view including the components of FIG. 8 and additionally showing a slider and a portion of the load beam;

FIG. 12 is a representational plan view of a disk drive, shown in part, with the head suspension of the present invention positioned at the inner diameter of a disk, and showing a lifter device for loading the head to the disk;

FIG. 13 is an enlarged side view, partly broken away, illustrating two head suspensions with sliders mounted in a disk drive head stack assembly;

Similar numerals refer to similar elements in the drawing. It should be understood that the sizes of the different components in the Figures are not in exact proportion, and are shown for visual clarity and for the purpose of explanation.

DETAILED DESCRIPTION OF THE INVENTION

Figure 4:
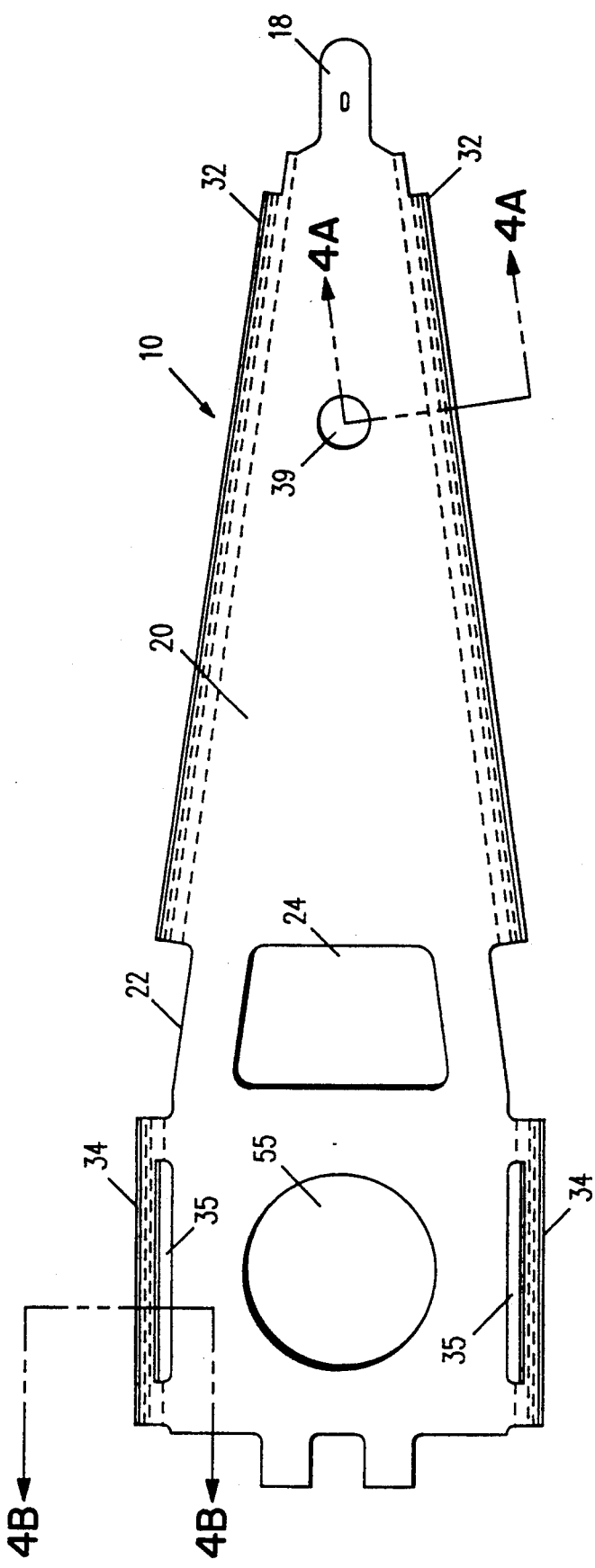
FIG. 4 is a top plan view of the load beam element of the head suspension of FIG. 1.
Figure 4A:
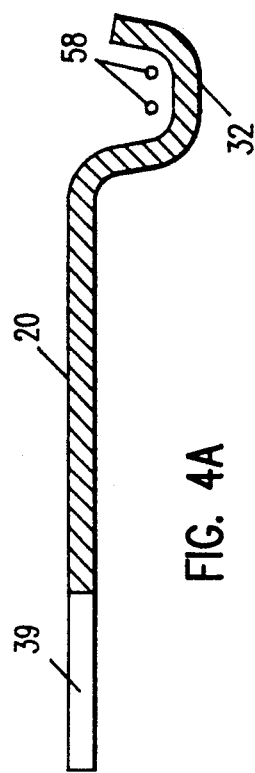
FIG. 4A is an enlarged sectional view taken along lines A—A of FIG. 4.
Figure 4B:
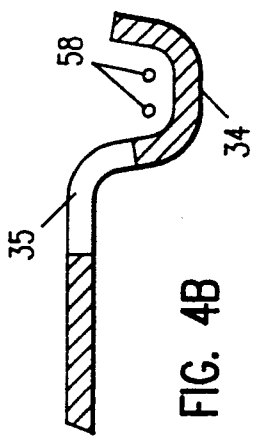
FIG. 4B is an enlarged sectional view taken along lines B—B of FIG. 4.

FIGS. 1-3 illustrate a head suspension assembly that is fabricated with a load beam 10, a flexure 12, a swage plate 14 and an air bearing slider 16. A thin film transducer (not shown) having a transducing gap is deposited at the trailing end of the slider 16. As illustrated in FIG. 1, the load beam 10 is fabricated with a short front end tongue 18, a central triangular-type major section 20 without an apex, a leaf spring or flexible section 22 and a rectangular rear mount section 26. The tongue 18 is made sufficiently narrow to avoid interference with side legs 43 of the flexure 12 surrounding a cutout 41, shown in FIG. 5. The tongue 18 is formed with an aperture 38 that is large enough to allow passage of light through the aperture, but not so large as to reduce the stiffness required of the load beam tongue. The applied light is used during the assembly of the slider to the flexure. A hole 28 is provided in the rear section 26 of the load beam 10 to allow connection of the swage plate 14 to the load beam by means of a boss 30 and laser welding. The swage plate provides stiffness to the rear section 26 of the load beam. Relief slots 35 are provided to reduce stresses caused by bent flanges 34 and to avoid kinking thus maintaining the flatness of the rear section 26.

The leaf spring 22 between the load beam central major section 20 and the rear mount section 26 is formed with a trapezoidal-like cutout 24 to provide flexibility. The leaf spring 22 is biased to provide a desired load force to counteract the aerodynamic lift force generated by a rotating disk during operation of the disk drive.

A damping element 19 made of elastomer about 0.002–0.005 inch thick is laid down on the top surface of the major section of the load beam to minimize undesirable resonances of the suspension, as shown in FIG. 1. Alternatively, a shorter elastomer piece 21 may be deposited on the bottom surface of the load beam without interfering with the flexure 12. In either case, the elastomer is preferably covered with a stainless steel plate 23 about 0.0025 inch thick, shown in FIG. 3 on top of the elastomer 19.

As shown in FIG. 4, the load beam 10 is formed with front flanges 32 and rear flanges 34 with a hiatus therebetween at the area of leaf spring 22. The front flanges 32 extend from the leaf spring section 22 to the load beam tongue 18 and end or are relieved before the area of location of a load dimple 50 (see FIG. 2) formed in the flexure 12. The absence of flange structure at the load dimple area allows the exit of the narrow flexure from the front central flat section of the load beam 10. Also, the relieved flange structure allows the wires 58 (see FIG. 2) to be formed in longer loops and have the flexibility that permits free gimbaling action of the slider 16. This contrasts with prior known load beam flange structures that are coextensive with the major section of the load beam and receive short taut sections of wires which are taken from the slider and directed straight to the flanges.

The flanges 32 and 34 are made with shallow U-shaped channels respectively along the angled sides of the central major section 20 and along the sides of the rear mount section 26. The flanges 32 and 34, which provide stiffness to the load beam, are bent so that the U-shaped channels of the flanges project in a direction toward the disk surface when the head suspensions are assembled in a disk drive. The ends of the open part of the U-channel are substantially in the same plane as the thin flat load beam 20. As a result, the head suspensions can be stacked closer without interference from the flanges.

To enable passing signals between the transducer and head circuitry, insulated electrical wires 58 are connected to the coil of the transducer deposited on the slider 16 as shown in FIG. 2. The wires 58 are positioned within the shallow U-shaped channels of the flanges 32 and extend to and through the channels of flanges 34. The wires 58 do not need to be encased in tubing.

FIGS. 5-8 depict the flexure 12 and FIG. 8A illustrates the flexure 12 attached to a slider 16. The flexure 12 is fabricated with an oval rear end 36 and a U-shaped finger 40 at the rectangular front end. The base of the U-shaped finger points towards the oval rear end of the flexure. The finger 40 is defined by a surrounding U-shaped cutout 41 that is formed around the finger 40, leaving narrow side legs 43. The side legs 43 of the flexure which contribute to the gimbal action of the slider 16 are preferably made as close together as possible to achieve low roll stiffness, but yet are spaced sufficiently apart to accommodate the load beam tongue aperture 38 used for passing light to impinge on the adhesive used for joining the flexure and slider. The cutout 41 also allows access to infrared or ultraviolet radiation for application to the adhesive.

When the head suspension is loaded to a rotating disk in a disk drive, the flexure 12 allows the slider to follow the variations in topography of the rotating disk surface. A hemispherical load dimple 50, which is stamped in the flexure finger 40, is disposed between an elliptical aperture 42 and circular hole 44 used for alignment and assembly purposes. The height of the load dimple 50 is minimized to keep the Z-height (vertical height of the head suspension) as small as possible. However sufficient clearance space is provided between the load beam 10 and the slider 16 to allow free gimbaling of the slider as it pitches and rolls about the load dimple 50 without interference by the load beam.

Figure 9:
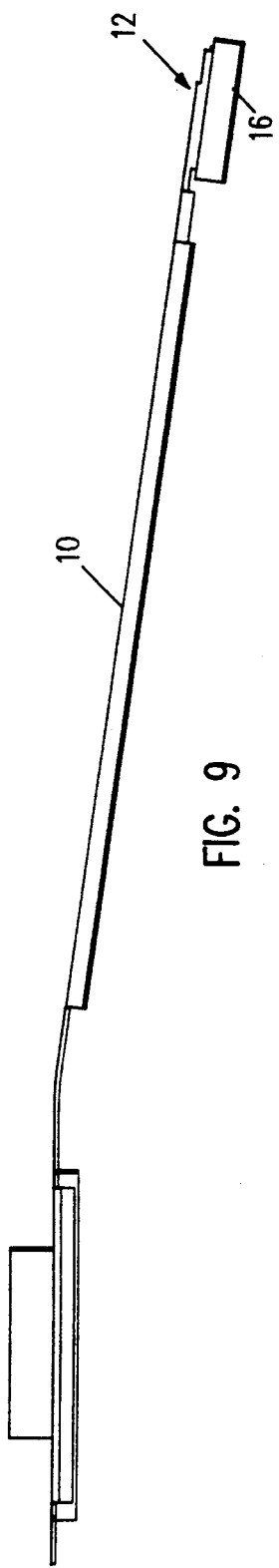
FIG. 9 is a side view of the head suspension of FIG. 1, shown in an unloaded position.
Figure 10:
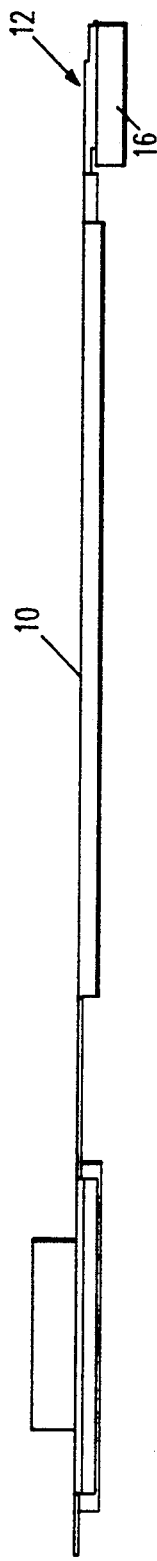
FIG. 10 is a side view of the head suspension of FIG. 1, shown in a loaded position.
Figure 11:
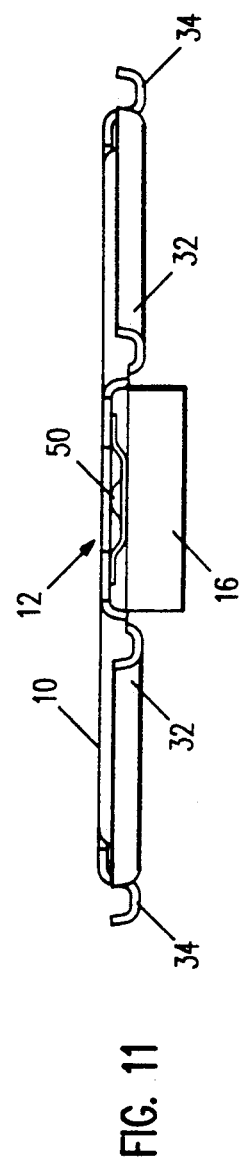
FIG. 11 is an enlarged front end view of the loaded head of FIG. 10.

FIG. 9 shows a head suspension in an unloaded position when the disk drive is not in operation. FIG. 10 shows the head suspension in the loaded position when the disk drive is in operation and in the track seeking or accessing modes. The suspension is mounted to a head actuator 52 (FIG. 12), which may be a rotary voice coil motor, for moving the head to selected data tracks on the disk. FIG. 11 is a front end view of the suspension in FIG. 10.

FIG. 12 depicts a head suspension including a load beam 10 attached to an actuator arm 52 that is rotated to move radially across the surface of a rotating disk 60. To load the head to the disk, a lifter device 62, which may be a triangular knife serving as a ramp, is moved under the unloaded suspension and advanced radially inward to raise the suspension to the loaded position, as represented in the phantom line drawing at the outer diameter (OD) of the disk.

By virtue of the narrow structure design of the load beam tongue 18 and flexure at the slider area, the head can access more data tracks on the disk as it moves from the inner diameter (ID) to the QD of the disk.

FIG. 13 is a sectional view showing two head suspensions with sliders in a headstack assembly loaded to the top and bottom surfaces of a disk 60.

Figure 14:
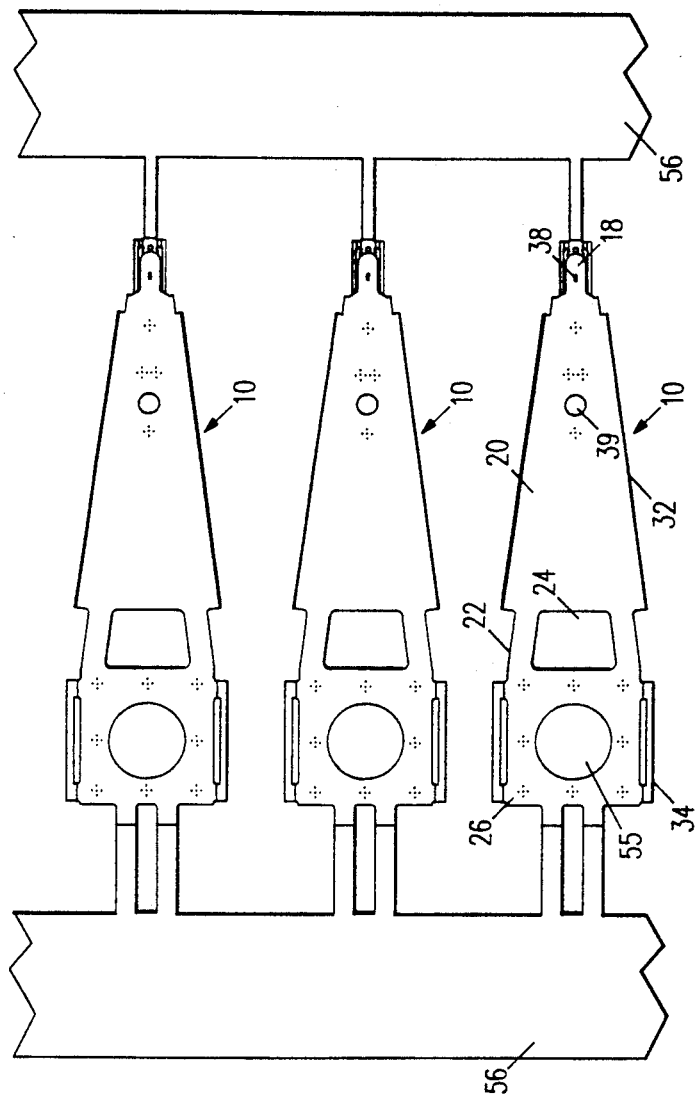
FIG. 14 is a plan view representing a fret assembly of suspensions in production stamped from stainless steel.

During manufacture of the head suspension assembly, a sheet of 300 Series type stainless steel material, about 0.0025 inch thick, is stamped to produce a multiplicity of frets or patterns shaped as load beams, as illustrated in FIG. 14. Alignment holes 39 are provided to accommodate pins that are used for alignment and assembly of flexures 12 with the load beams 10. When aligned, the load beams and flexures are joined by laser welding so that each load beam and attached flexure are symmetrical about a common longitudinal axis. The swage plates 14 made of stainless steel are then attached to the rectangular sections 26 of the load beams to ensure rigidity of the rear sections of the suspensions.

Figure 15:
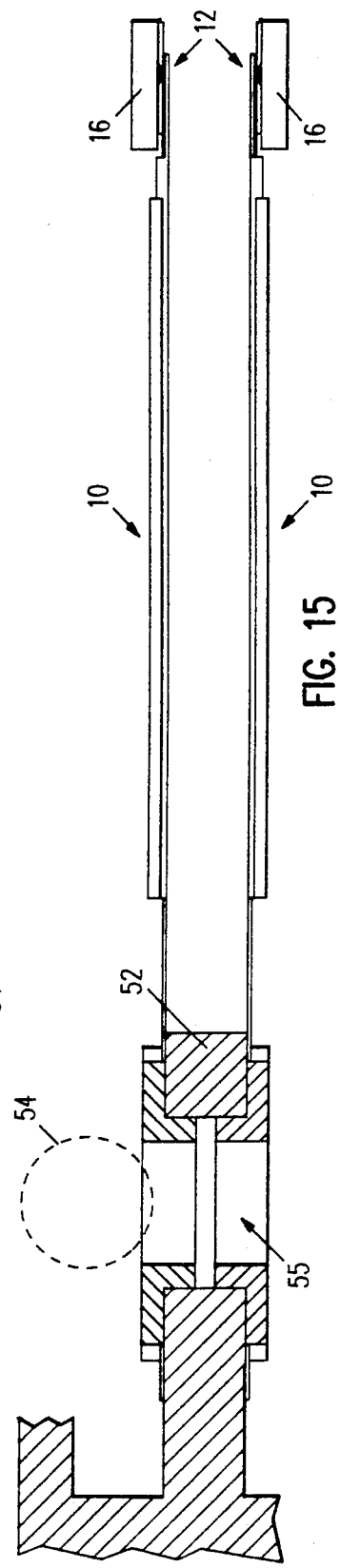
FIG. 15 is a side view illustrating two head suspensions mounted to a head actuator.

As shown in FIG. 15, two head suspensions including load beams 10, flexures 12 and sliders 16 are joined to a head arm and actuator 52 by ball staking or swaging. A spherical ball 54 is driven through staking holes 55 to swage the suspension to the head arm, as is known in the art.

During assembly of the slider to the flexure, an epoxy adhesive is dropped onto the top non-air bearing surface of the slider. By means of tooling holes, the flexure (with the attached load beam) is aligned with the slider and positioned on the top surface causing the fluid adhesive to spread and form a thin band within the flexure cutout 41 around the flexure finger 40. The adhesive flows to the areas of the flexure holes 42 and 44 as shown in FIGS. 5, 8 and 8A. Infrared light or ultraviolet radiation is directed through the load beam tongue aperture 38 and the adjacent flexure hole 42 and the hole 44 and to the cutout area 41 make the adhesive tacky, thereby holding the parts in place. The assembly is placed in an oven at a specified temperature to cure the adhesive and thereby fix the parts securely.

The head suspension disclosed herein is characterized by low pitch and row stiffness, low bending stiffness in the load beam spring area with decreased gram load tolerance effects, and by a high first bending mode resonant frequency.

What is claimed is:

1. A magnetic head suspension assembly for transducing data that is recorded and read out from a surface of a rotating magnetic disk drive comprising:
    a load beam formed with a central major section;
    a narrow tongue section at the front end of said load beam;
    a mount section at the rear end of said load beam for enabling mounting said suspension to an actuator arm;
    a leaf spring section between said rear mount section and said major section for providing flexibility to said load beam;
    a flexure having a finger with a load dimple formed thereon;
    means for joining said flexure to said load beam;
    an air bearing slider having leading and trailing ends supported by said flexure for free gimbaling motion about said load dimple; and
    an adhesive material disposed between the top non-air bearing surface of said slider and said flexure finger, an aperture formed in said load beam tongue and a hole formed in said flexure finger, said aperture and hole being aligned for passing radiation through said aperture and said hole to said adhesive and thereby secure the slider to the flexure without undesirable distortion or stress.

2. A head suspension assembly as in claim 1, wherein said flexure is joined to said slider so that no portion of said flexure projects from the leading end of said slider.

3. A head suspension assembly as in claim 1, wherein said central major section of said load beam is triangular in shape without an apex, the narrow end of said triangular-shaped major section being sufficiently wide to receive said flexure.

4. A head suspension assembly as in claim 1, including a cutout portion in said leaf spring section for providing flexibility to said suspension.

5. A head suspension assembly as in claim 1, including a damping material deposited on the bottom and top surfaces of said central major section of said load beam.

6. A head suspension assembly as in claim 5, wherein said damping material is an elastomer about 0.002-0.005 inch thick.

* * * * *